Feb. 6, 1962 H. W. CLARKE 3,019,783
COVERED DISH AND TRAY COMBINATION
Filed Oct. 14, 1957 2 Sheets-Sheet 1

INVENTOR:
Houghton W. Clarke,
BY Davsen, Titton, Fallon & Lungmus
ATTORNEYS.

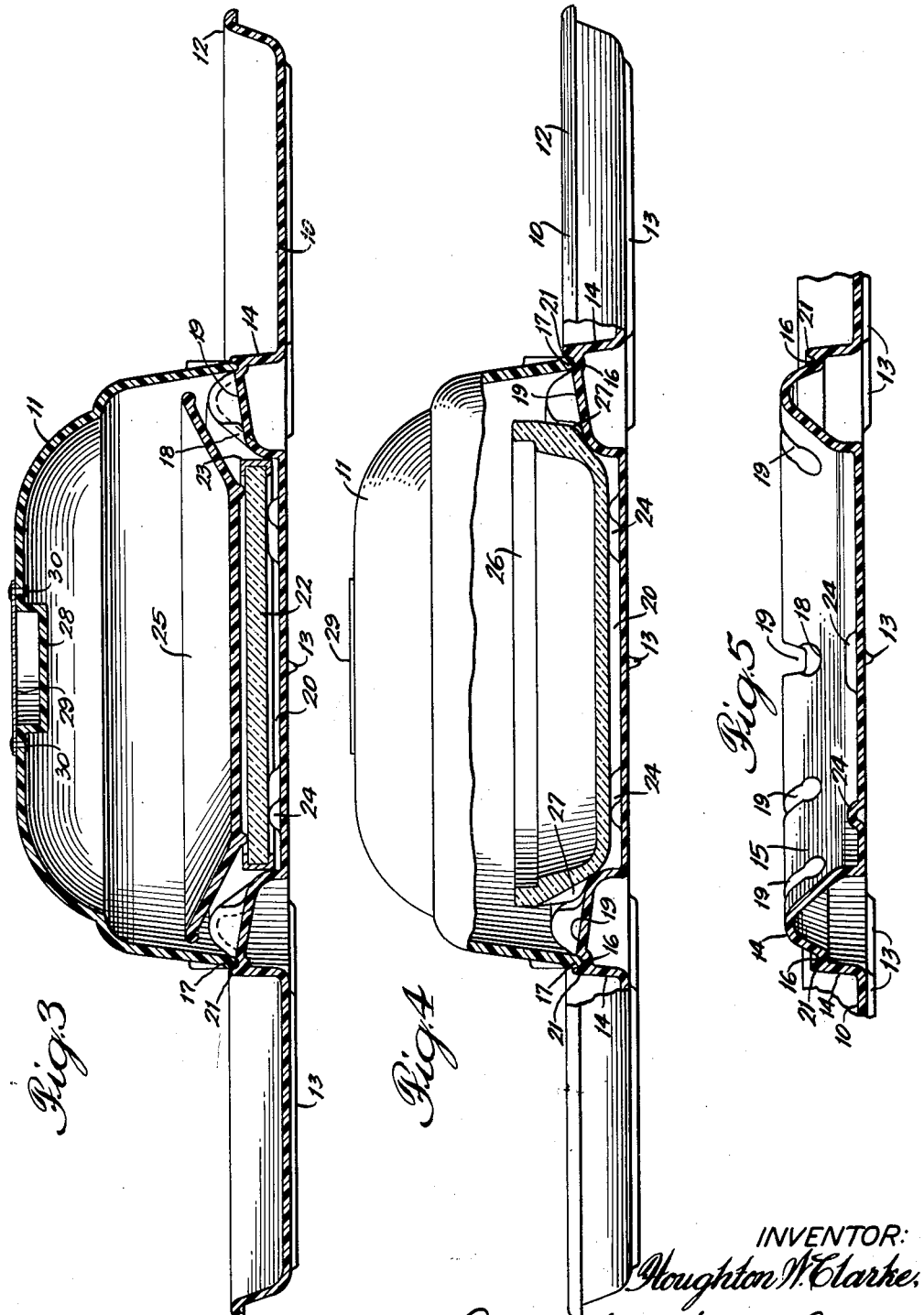

United States Patent Office 3,019,783
Patented Feb. 6, 1962

3,019,783
COVERED DISH AND TRAY COMBINATION
Houghton W. Clarke, Evanston, Ill., assignor of ninety-nine percent to Mealpack Corporation, Evanston, Ill., a corporation of Illinois
Filed Oct. 14, 1957, Ser. No. 690,113
7 Claims. (Cl. 126—381)

This invention relates to a covered dish and supporting base or tray combination particularly useful for maintaining prepared foods at serving temperature and in savory condition, and for the serving of such foods.

The present application is a continuation-in-part of my co-pending appliactions Serial No. 517,743 filed June 24, 1955, now Patent No. 2,886,225, and Serial No. 553,894 filed December 19, 1955, now abandoned.

In hospitals, plants and the like, it is frequently necessary to place foods (either hot or chilled) in dishes well in advance of the time of delivery or serving. Under these conditions, difficulty often arises not only in maintaining the foods at the desired serving temperatures but also in preventing those foods from drying out and losing their flavor because of escaping aroma and moisture. The present invention is concerned with an improved dish and tray combination for overcoming these difficulties.

One of the principal objects of the present invention is to provide a vacuum-sealing dish-supporting base and cover combination equipped with a removable heat-chargeable element for keeping the covered foods in proper serving condition during delivery, or awaiting delivery, to a consumer. In this connection, it is a specific object to provide an element which will slowly release its pre-charge of heat while at the same time will operate to vaporize condensation within the container and thereby maintain the stored foods in moist and flavorful condition.

Another important object of the present invention is to provide means for conveying condensation to the heat element for re-vaporization within the vacuum-sealed container, thereby preventing flavor loss through evaporation and escape of the flavor-laden vapors.

A further object is to provide a liquid seal between the tray and cover of a food container to seal the food aromas therein. An adidtional object is to provide a combination wherein a conventional plate or dish may be used to support food within the sealed space of a container, the plate being maintained at a desired temperature for the serving of food by heat from a heat-charged element.

Other objects will appear from the specification and drawings in which:

FIGURE 3 is a cross-sectional view of the combination taken along line 3—3 of FIGURE 1.

FIGURE 4 is a side elevation taken partly in section and illustrating a modified form of the invention in which a single dish-heating element is substituted for the separate heat element and plate of the preceding embodiment.

FIGURE 5 is a broken sectional view of the tray taken along line 5—5 of FIGURE 2.

Figure 1:
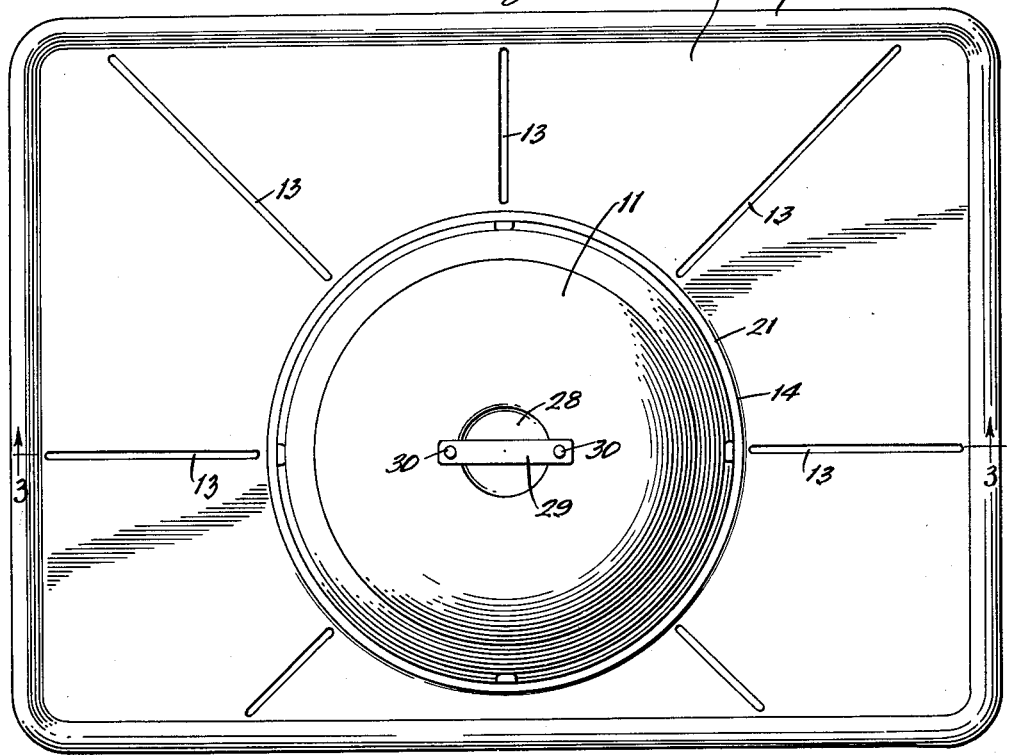
FIGURE 1 is a top plan view of a dish and tray combination embodying the present invention, the cover for the tray being illustrated in mounted condition.

Referring to the drawings in detail, the numerals 10 and 11 generally designate a tray and cover respectively. These part smay be die-formed from any suitable material having the desired qualities of strength and low heat conductivity such as a temperature resistant polyethylene or any of a number of other well-known plastic materials. Other materials such as suitable metals, fiberglass, etc. may also be used. The tray or base 10 is provided with the usual upturned rim 12 and may also be provided with reinforcing ribs or indentations 13 radiating outwardly along its undersurface.

In FIGURES 2 through 5, it will be seen that the tray has a centrally disposed annular shoulder 14 formed integrally therewith. The inner wall surface 15 of the upstanding shoulder is inclined upwardly and outwardly while the outer wall surface thereof is provided with a peripheral groove or channel 16. This channel receives the lower edge 17 of the cover or lid 11 and is adapted to retain condensate in sufficient quantities to provide a moisture-seal between the respective parts, as will be described shortly.

Figure 2:
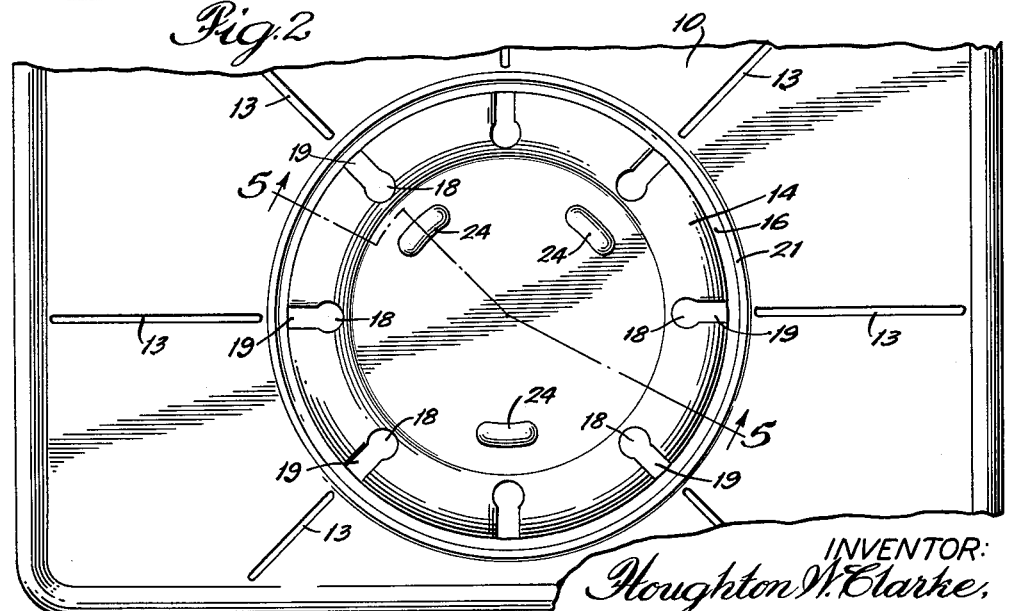
FIGURE 2 is a broken top plan view similar to FIGURE 1 but showing the tray with the cover and dish removed therefrom.

As illustrated most clearly in FIGURES 2, 3 and 4, the sloping inner wall 15 of the shoulder is provided with a plurality of uniformly spaced recesses 18 intermediate the upper and lower limits thereof and, communicating with each of these recesses is a radially extending drain passage or trough 19. These passages angle downwardly and inwardly from the outer channel 16 and thereby place that channel in communication with the central space or cavity 20 defined by the annular shoulder. It will be noted (FIGURES 3 and 4) that the passages or troughs 19 enter the channel 16 slightly above the deepest part thereof and that the outer wall of the shoulder is equipped with an upstanding flange 21 which projects above the highest points of the troughs.

In the embodiment of the invention represented in FIGURES 1 to 3, a thick disk or heat-retaining member or heat-chargeable element 22 is disposed within the space 20 bordered by the annular shoulder 14. This member is formed from a heat absorbent material capable of absorbing heat thoroughly and of giving up the deep heat slowly when removed from the heating source. Ovenware glass, such as Pyrex type glass, or crockery, etc. may be employed. Also, various heat-absorbing resins may be utilized for this purpose. Preferably, a metal rim 23 extends about the periphery of disk 22 and not only protects the edges of the disk but also promotes a greater emission of heat about the periphery thereof. Rim 23 may be formed of aluminum, stainless steel, or any other suitable material having relatively high emissivity in the longer wave length ranges.

In the illustration given, the supporting base or tray is provided with three circumferentially-spaced projections 24 which extend upwardly into the cavity 20 defined by the shoulder for supporting disk 22 at a spaced distance above the surface of the tray. Consequently, the disk is only in limited surface contact with the tray and a minimum of heat (or cold) will bleed from the deeply-charged disk into the tray. It will also be noted that when the disk is supported upon projections 24, the metal-rimmed periphery thereof is disposed adjacent the lower ends of troughs 19 and at substantially the same elevation as those troughs.

The disk in turn supports a plate or dish 25 on which the food is placed and served. The plate may be formed of china or earthenware or, if desired, it may be formed of oven-glass, plastic materials or any other materials suitable for the serving of prepared foods.

In operation, disk 22 is heated within an oven or by an infra-red heat-charging device until the same contains a high degree of heat. A charge of 250 to 275 degrees F. has been found effective although it will be understood that temperatures above and below this range might be used. Preferably, plate 25 is also charged with heat before the hot prepared foods are placed thereon. The pre-charged disk and food-containing dish are then placed upon the tray and are covered by the dome-shaped imperforate and impermeable cover 11.

It is believed evident that the heat-charged oven-glass disk 22 serves as a heating element which slowly emits heat to maintain the prepared foods at serving temperatures. Shortly after the cover has been placed over the prepared foods the temperature of the confined air beneath the cover rises to a maximum level by reason of the heat emitted from the heating element, plate and foods. Moisture from the hot foods collects on the undersurface of the cover and flows downwardly along the cover's sloping walls into the peripheral groove 16 of the annular shoulder 14. As the temperature slowly drops, the pressure within the confined space decreases and the resulting vacuum effect causes the lower edge portion 17 of the cover to seat tightly within the moisture-containing groove 16. Thus, a moisture seal is formed between the cover and tray to prevent the escape of aroma-laden vapors and to block the entry of cooling air from outside the cover. The resulting partial vacuum within space 20 also minimizes the intermingling of food flavors, lessens oxidation leading to food discoloration, and serves to maintain the fresh and appetizing appearance of the prepared foods.

Further condensation flowing downwardly along the cover's inner surface, as well as excess moisture overflow from the channel during the vacuum sealing of the cover and tray, flows downwardly and inwardly along radial troughs 19 towards the periphery of heat element 22. The heat emitted from the element and particularly from the metal rim thereof tends to re-vaporize the condensate and recirculate the vapors to keep the foods in flavorful and savory condition. Since plate 25 is directly above the supporting heat element, both the plate and the food contained therein will be maintained at serving temperature for long periods by the deep heat slowly emitted from the pre-charged heat element.

The modification illustrated in FIGURE 4 is identical to the structure already described except that a single oven-ware dish 26 is substituted for the plate and heating element combination previously described. The dish 26 is formed from oven-glass or any other suitable heat-retaining material and is provided along its outer periphery with a plurality of integrally-formed semi-globular knobs or projections 27 adapted to be received within the semi-globular recesses 18 of the annular shoulder. Thus, the dish and tray may be effectively locked against relative rotation. However, if it should be desired to rotate the dish with reference to the tray, this may be accomplished by a very slight raising of the dish so that the dish will move out of the recesses and can then be rotated to bring the knobs into the next recesses. In this operation, the inclined wall 15 of the tray cooperates in releasing the knobs from recesses 18.

Like heat-element 22, dish 26 is chargeable with heat and will then slowly release this heat to maintain the prepared foods at a desired temperature. Since troughs 19 communicate with the semi-globular recesses 18, condensate flowing downwardly and inwardly along the troughs will be directed towards the knobs of the heat-charged dish seated within those recesses. As the moisture spreads over the enlarged knobs it is heated thereby and re-vaporized. Therefore, as in the previously described embodiment, the cover, the trough-providing tray, and the heat-charged dish all cooperate to keep the prepared foods in proper serving condition.

It is believed apparent that the lateral portions of the tray or base between the shoulder 14 and rim 12 may be utilized for supporting small dishes, glasses, and eating utensils, as well as food products which may be served at room temperature. The tray may be used to support the dishes and utensils while the food is being consumed, the heat-element serving to maintain the entree in heated condition after cover 11 has been removed. However, it will be understood that while the drawings present a preferred embodiment, a tray or base might be provided without the lateral portions beyond the shoulder and still fall within the scope of the present invention.

Preferably, the cover is provided with a central recess 28 bridged by a metal handle strap 29 which may be secured to the cover by rivets 30 or by any other suitable connecting means. Since handle 29 is substantially flush with the top of the cover, a number of such covers may be easily stacked for storage and handling. The handle strap is also useful in holding identifying cards, menus, etc. for indicating the nature or destination of the meal.

While in the foregoing I have disclosed two embodiments of the present invention in considerable detail for purposes of illustration, it will be understood by those skilled in the art that many of these details may be varied without departing from the spirit and scope of the invention.

I claim:

1. In a structure of the character described, a base having a raised shoulder defining a central cavity and being provided with a peripheral channel extending about said cavity, said channel being substantially shallower than the height of said shoulder, a solid heat-chargeable element removably disposed within said cavity and having its outer periphery disposed adjacent the inner surface of said shoulder, said element providing a top surface for the support of hot prepared meals within said cavity, and a removable cover having its lower edge portion seated within said peripheral channel, said shoulder being provided with at least one passage extending downwardly and inwardly from said channel and having its lower end terminating adjacent the outer periphery of said heat-chargeable element, whereby, vapors condensing upon the inner surface of said cover flow into said channel to provide a liquid seal between said cover and base and form a partial vacuum within said cavity, said passage carrying excess condensate from said channel into direct contact with the outer periphery of said element for re-vaporization thereby.

2. The structure of claim 1 in which said heat-chargeable element comprises a thick ovenware disk capable of receiving a heat charge and slowly emitting the heat therefrom, and a dish resting directly upon said disk and adapted to contain a hot prepared meal.

3. The structure of claim 1 in which said removable heat-chargeable element comprises a thick ovenware dish adapted to be heat-charged and to transmit the heat slowly to foods contained therein.

4. A dish and dish holder combination comprising a base having a raised shoulder defining a central cavity and being provided with a peripheral channel extending about said cavity, a heat-chargeable element removably supported within said cavity, a dish removably disposed upon said element, and a removable cover extending over said dish and element and having a lower edge portion seated within said peripheral channel, said shoulder being provided with passage means extending between said channel and said element, said element being disposed at substantially the same elevation as said passage means and having its periphery in close proximity thereto, said heat-chargeable element comprising a thick ovenware member capable of slowly emitting a heat charge and being provided with a metal rim extending thereabout for the peripheral release of charge heat, said metal rim being disposed in close proximity to said passage means for contacting and vaporizing condensate conveyed thereby, whereby, vapors condensing upon the inner surface of said cover flow into said channel to provide a liquid seal between said cover and base and form a partial vacuum within said cavity, said passage means directing excess condensate from said channel towards the periphery of said element for revaporization thereby.

5. In a structure of the character described, a base having a raised shoulder defining a central cavity and having downwardly and outwardly sloping side walls, said base also being provided with a peripheral channel extending about said cavity and along said shoulder and being substantially shallower than the height of said shoulder, a solid heat-chargeable element removably supported within said cavity and having a top surface for supporting hot prepared meals therein, and a removable cover extending over said element and said shoulder and having a lower edge portion seated within said shallow channel, said shoulder being provided with downwardly and inwardly sloping passages extending between said shallow channel and said central cavity, said heat-chargeable element having outer peripheral surfaces spaced radially inwardly from said shoulder and in line with said passages for revaporization of condensate and for the recirculation of vapors formed when condensate flowing inwardly and downwardly along said passages impinges on the outer peripheral surfaces of said heat-chargeable element.

6. The structure of claim 5 in which said base is provided with a plurality of circumferentially-spaced and integrally-formed upstanding projections within said cavity for providing limited surface contact between said base and said heat-chargeable element.

7. The structure of claim 5 in which said heat-chargeable element comprises a thick ovenware member capable of slowly emitting a heat charge and having a metal rim extending thereabout for the peripheral release of charged heat, said metal rim being disposed in line with said passage means for contacting and vaporizing condensate carried thereby.

References Cited in the file of this patent

UNITED STATES PATENTS

| | | |
|---|---|---|
| 164,964 | Brown | June 29, 1875 |
| 776,926 | Misener | Dec. 6, 1904 |
| 790,612 | Boniface | May 23, 1905 |
| 804,184 | Boeck | Nov. 7, 1905 |
| 1,275,222 | Chamberlen | Aug. 13, 1918 |
| 1,290,771 | Meadows | Jan. 7, 1919 |
| 1,412,717 | Stowell | Apr. 11, 1922 |
| 1,684,297 | Cary | Sept. 11, 1928 |
| 1,789,349 | Ballman | Jan. 20, 1931 |
| 2,582,735 | Alaj | Jan. 15, 1952 |
| 2,598,995 | Graff | June 3, 1952 |
| 2,830,576 | Torino et al. | Apr. 15, 1958 |

FOREIGN PATENTS

| | | |
|---|---|---|
| 85,702 | Switzerland | Sept. 1, 1920 |